United States Patent
Xu et al.

(10) Patent No.: US 10,272,832 B2
(45) Date of Patent: Apr. 30, 2019

(54) LIGHTING PIPE INTEGRATED WITHIN SUNROOF TRIM RING

(71) Applicant: FORD GLOBAL TECHNOLOGIES, LLC, Dearborn, MI (US)

(72) Inventors: Wei Xu, Nanjing (CN); Satyanarayana Raju Vemulapati, Westland, MI (US); Alex Lince, St. Claire Shores, MI (US); Jonathan Alabran, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/637,892

(22) Filed: Jun. 29, 2017

(65) Prior Publication Data

US 2019/0001875 A1 Jan. 3, 2019

(51) Int. Cl.
| | |
|---|---|
| *B60Q 3/208* | (2017.01) |
| *B60Q 3/53* | (2017.01) |
| *B60Q 3/54* | (2017.01) |
| *F21V 19/00* | (2006.01) |
| *F21W 106/00* | (2018.01) |

(52) U.S. Cl.
CPC ........... *B60Q 3/208* (2017.02); *B60Q 3/53* (2017.02); *B60Q 3/54* (2017.02); *F21V 19/0075* (2013.01); *F21W 2106/00* (2018.01)

(58) Field of Classification Search
CPC ... B60Q 3/64; B60Q 3/78; B60Q 3/74; B60Q 3/208; B60Q 3/51
See application file for complete search history.

(56) References Cited

U.S. PATENT DOCUMENTS

| | | | | |
|---|---|---|---|---|
| 5,400,225 A | * | 3/1995 | Currie | B60Q 1/0011 362/554 |
| 5,678,914 A | * | 10/1997 | Dealey | B60Q 3/66 362/485 |
| RE36,642 E | * | 4/2000 | Ziadi | B64D 11/00 362/471 |
| 6,250,785 B1 | * | 6/2001 | Mallia | B60Q 1/323 362/495 |
| 6,594,417 B1 | * | 7/2003 | Hulse | G02B 6/001 362/487 |
| 6,666,571 B2 | * | 12/2003 | Becher | B60J 7/00 362/490 |
| 6,974,238 B2 | | 12/2005 | Sturt et al. | |
| 7,748,883 B2 | * | 7/2010 | Sun | G02B 6/0008 248/65 |
| 7,938,566 B2 | * | 5/2011 | Ishida | B60Q 3/64 362/471 |
| 7,967,486 B2 | | 6/2011 | Ludwig et al. | |

(Continued)

*Primary Examiner* — Christopher Stanford
(74) *Attorney, Agent, or Firm* — Vichit Chea; Brooks Kushman, P.C.

(57) ABSTRACT

A trim component is provided. The trim component may include a trim panel, a backing layer, and at least one light pipe. The trim panel may have tapered side walls that extend from an inner portion of the panel and terminate at an edge to define a moonroof opening. The backing layer may wrap around the edge to define a trim ring. The trim panel may include integrated carriers that may project away from the panel and around the trim ring. The at least one light pipe may be disposed within the integrated carriers.

20 Claims, 3 Drawing Sheets

(56) References Cited

U.S. PATENT DOCUMENTS

| | | | | |
|---|---|---|---|---|
| 8,235,460 B2* | 8/2012 | Plavetich | .............. | B60Q 1/268 |
| | | | | 296/146.15 |
| 8,840,287 B2* | 9/2014 | An | .......... | B60Q 3/20 |
| | | | | 362/23.14 |
| 9,254,785 B2* | 2/2016 | Sohizad | .............. | G02B 6/001 |
| 9,376,057 B2* | 6/2016 | Willerton | .............. | B60Q 3/51 |
| 9,397,075 B2* | 7/2016 | Bauerle | .............. | B60Q 1/268 |
| 9,987,980 B2* | 6/2018 | Albert | .............. | B60J 7/0015 |
| 2003/0174516 A1* | 9/2003 | Goto | .............. | G02B 6/0001 |
| | | | | 362/551 |
| 2010/0080010 A1* | 4/2010 | Marui | .............. | B60Q 3/74 |
| | | | | 362/488 |
| 2010/0149831 A1* | 6/2010 | Zheng | .............. | G02B 6/0088 |
| | | | | 362/551 |
| 2010/0277946 A1* | 11/2010 | Shallcross | .............. | G02B 6/001 |
| | | | | 362/581 |
| 2011/0170304 A1* | 7/2011 | Fujita | .............. | G02B 6/0008 |
| | | | | 362/501 |
| 2011/0240695 A1* | 10/2011 | Aftanas | .............. | B60Q 1/2611 |
| | | | | 224/311 |
| 2013/0058115 A1* | 3/2013 | Pfeil | .............. | G02B 6/001 |
| | | | | 362/511 |
| 2014/0226353 A1* | 8/2014 | Sohizad | .............. | G02B 6/001 |
| | | | | 362/511 |
| 2014/0265934 A1 | 9/2014 | Ramey | | |
| 2015/0003093 A1* | 1/2015 | Omura | .............. | B60Q 3/51 |
| | | | | 362/511 |
| 2015/0274066 A1* | 10/2015 | Del Pozo Gonzalez | .............. | |
| | | | | B60R 13/02 |
| | | | | 362/551 |
| 2015/0316711 A1* | 11/2015 | North | .............. | G02B 6/0096 |
| | | | | 362/551 |
| 2016/0236613 A1* | 8/2016 | Trier | .............. | B60R 13/04 |

* cited by examiner

LIGHTING PIPE INTEGRATED WITHIN SUNROOF TRIM RING

TECHNICAL FIELD

This disclosure relates to a lighting system integrated within an interior component of a vehicle roof.

BACKGROUND

Automakers are increasingly implementing various types of lighting within the cabin of vehicles. Ambient lighting may improve the quality and craftsmanship of the vehicle interior as perceived by an occupant. The additional lights may also provide increases in perceived safety. Often the luminance of the lighting is kept relatively low to prevent the occurrence of uncomfortable glare and possible distraction. Another type of interior vehicle lighting, similar to ambient lighting, is courtesy lighting. Courtesy lighting provides light within the vehicle cabin when there is relatively low light or no light present around the vehicle to illuminate the interior when an occupant is entering or exiting the vehicle. Finally, functional lighting provides sufficient lighting to illuminate a majority of the cabin interior and is rarely used when the vehicle is driven. Some of the challenges associated with implementing these various types of vehicle lighting include packaging and cost constraints.

SUMMARY

According to one embodiment of this disclosure, a trim component is provided. The trim component may include a trim panel, a backing layer, and at least one light pipe. The trim panel may have tapered side walls that extend from an inner portion of the panel and terminate at an edge to define a moonroof opening. The backing layer may wrap around the edge to define a trim ring. The trim panel may include integrated carriers that may project away from the panel and are spaced around the trim ring. The at least one light pipe may be disposed within the integrated carriers.

According to another embodiment of this disclosure, a vehicle roof is provided. The vehicle roof may include a roof panel having a sunroof opening, a trim panel, a backing, and at least one light pipe. The trim panel may be disposed around an inner periphery of the opening and include tapered sidewalls that extend from the panel towards the opening. The backing may be folded over the edge to define a trim ring. The trim panel may include plural integrated stanchions that project away from the panel and are positioned around the trim ring. The at least one light pipe may be disposed within the integrated stanchions.

According to yet another embodiment of this disclosure, a trim component is provided. The trim component may include a trim reinforcement, a backing layer, and at least one light pipe. The trim reinforcement may have an outer periphery that extends around a sunroof opening and has tapered sidewalls extending from the trim reinforcement and terminates at an edge. The backing layer may wrap around the edge to define a Class-A trim ring and the trim reinforcement may include integrated carriers that project away from the reinforcement and around the trim ring. The at least one light pipe may be disposed within the integrated carriers.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
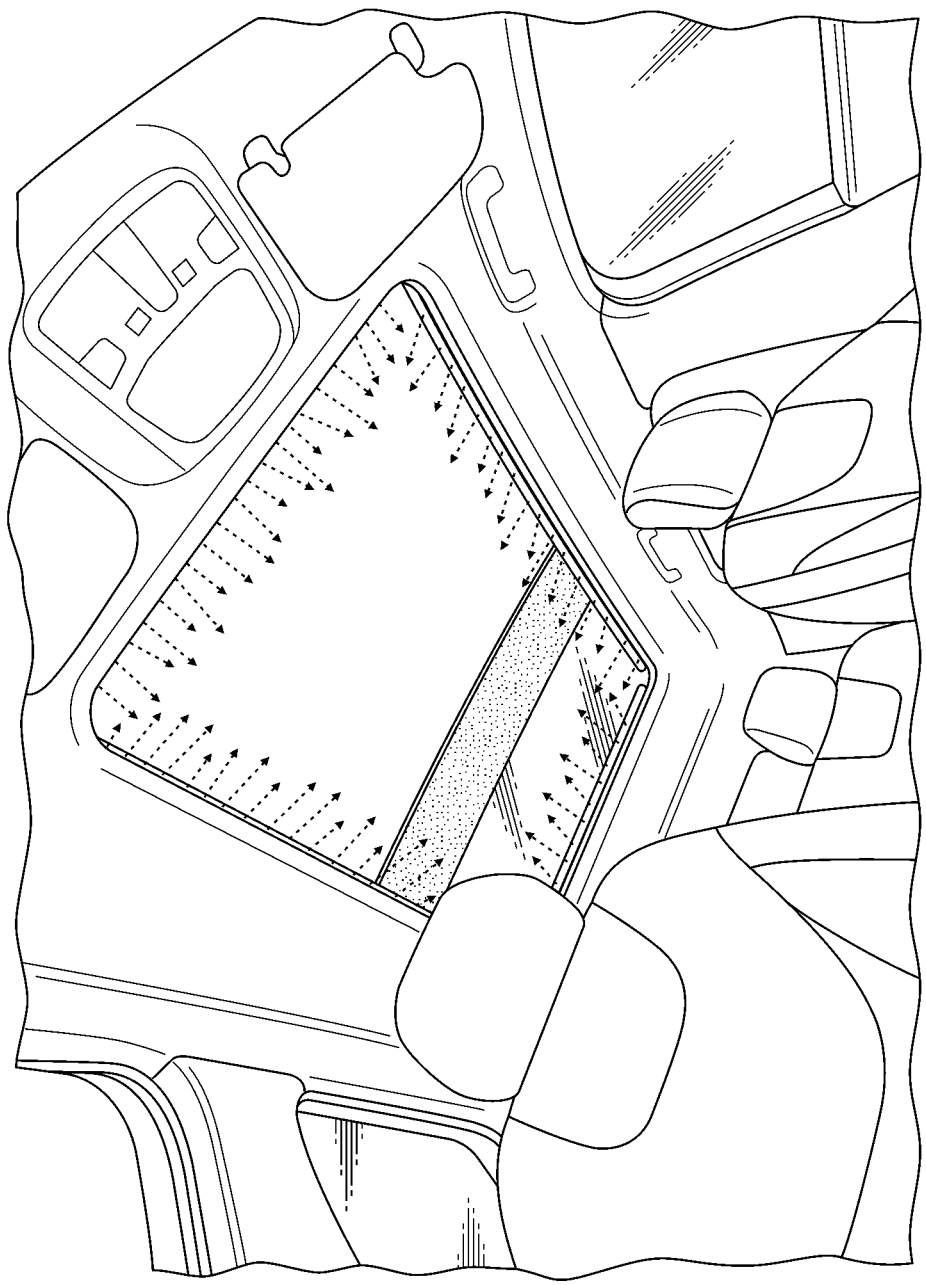
FIG. 1 illustrates a pictorial view of a vehicle roof including the trim ring reinforcement and light pipe.

Referring to FIG. 1, a pictorial view of a vehicle roof including a trim component and light pipe is illustrated. As will be described in greater detail below, the trim component extends around a periphery of the vehicle sunroof or moonroof. A light pipe may be integrated within the trim component so that light is projected inwardly along the directional arrows shown in the sunroof or moonroof.

Figure 2:
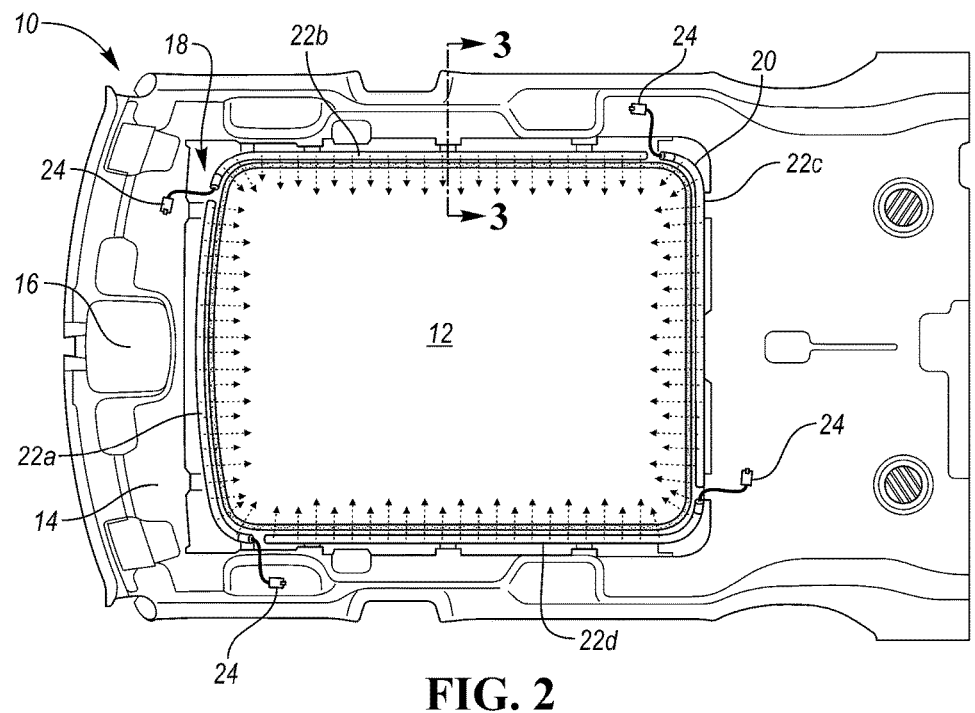
FIG. 2 is a top view of a vehicle roof including the trim ring reinforcement and light pipe.

Referring to FIG. 2, a top view of a vehicle roof 10 is illustrated. The vehicle roof 10 includes a sunroof or a moonroof opening 12 that is disposed rearward of the overhead console 16. Automotive sunroofs or moonroofs are generally a fixed or operable (venting or sliding) opening in the vehicle roof that allows light, or fresh air, or both, to enter the passenger compartment. The sunroof 12 may be manually operated or motor driven and may have many shapes, sizes and styles. The vehicle roof 10 may include a trim component 18 that surrounds a periphery of the sunroof 12. The trim component 18 may sandwich or hold up the headliner foam 14 against the vehicle roof 10. The headliner foam may be covered by a headliner cloth (not shown) or by other suitable means.

The trim component 18 may be disposed around or within the opening of the sunroof or moon roof to provide a finished edge wrap portion 20 the periphery of the opening 12. The edge wrap portion 20 provides a Class-A surface that may cover the inner periphery of the opening and the associated mechanisms used to open or close the opening 12. The vehicle panel includes one or more edges (e.g., peripheral edges, internal edges, etc.) that include a folded-over or wrapped edge. The folded-over or wrapped edges may be provided for aesthetic purposes and/or functional purposes. For example, the folded-over or wrapped edges may function as a reinforcement member that improves the strength and rigidity of the vehicle panel or foam 14. The folded-over or wrapped edge may also prevent creases from propagating from the edge and further help to reduce the chance of fabric fraying along an edge. The trim component 18 may be made from multiple layers, including but not limited to, a core of thermoset material, a thermoplastic adhesive, and a backing layer. The core or foam 26 (FIG. 2) may include one or more light weight material layers that may be porous or non-porous. For instance, a layer may be made from a polymer that irreversibly cures like a thermosetting polyurethane material layer like a polyurethane foam. One or more reinforcement mats, such as fiberglass mats, may be laminate to or at least partially embedded in the polyurethane material layer.

A light pipe 22 extends around the periphery of the opening 12 of the trim component 18 and is held in place by a carrier or stanchion 30 (FIG. 2). While four light pipes 22a-22d are shown adjacent to the periphery of the opening 12, more or fewer light pipes may be used. Each light pipe 22 is connected to a wire harness 36 that includes a connector 38 and a light source 40. The light pipes 22 may be tied to a controller (not shown) that is programmed to receive and send signals to illuminate the multiple light pipes 22a-22d. In addition to simply illuminating the light pipes 22a-22d, the intensity of the lights, color and pattern of illumination maybe controlled. For example, when a user approaches the vehicle and opens the door in a relatively low light setting, the controller may send a signal to initiate courtesy lighting. Courtesy lighting may provide sufficient illumination for the occupants to enter the vehicle and become seated. The controller may also illuminate the light pipes 22a-22d so that the lights pipe 22a-22d are illuminated to provide functional lighting, lighting that is brighter than the courtesy light. Yet another lighting mode is ambient lighting. Ambient lighting provides a relatively lower light intensity than that of courtesy or functional lighting modes. The ambient light mode may illuminate one light pipe 22 or all the light pipes 22a-22d. As an example, only the side light pipes 22b and 22d may be illuminated for a period of time or just the front and rear light pipes 22a and 22c may be illuminated. In other embodiments, only a portion of the light pipes 22a-22d may be illuminated. This illumination may occur in conjunction with the movement of sunroof as it is opened or closed.

The light pipe 22 may be a translucent pipe suitable for transmitting light as emitted from a light source 40. The light source 40 may include a plurality of light emitting diodes (LEDs) positioned so that light emitted from the LEDs enters an input end of the light pipe 22. The light pipe 22 is designed provide internal reflection of the light entering the light pipe 22, so that the light is reflected along an outer surface of the light pipe 22 as the light travels along the length of the light pipe 22 with minimal light loss. To minimize the amount of light lost within the light pipe 22, the light pipe 22 has an index of refraction that is higher than the index of refraction of the surrounding components e.g., the carrier 30, trim component 18 etc. The index of refraction describes how light propagates through a particular medium. So, the light emitting from the light source 40 is reflected within the body portion of the light pipe 22 with nearly total or complete internal reflection within the body portion of the light pipe 22 with little light absorption.

The light exiting the light pipe 22 between a semi-circular portion 32 of the carrier 30 may have been reflected multiple times within the body portion of the light pipe 22. The outer surface of the light pipe 22 may be etched or textured to increase the effective surface area to cause more light to exit through the semi-circular carrier portion. Further, the texturing of the outer surface of the light pipe 22 can be designed to evenly diffuse the light as it exits the light pipe 22 to minimize variations in the brightness of the light emitting from the light pipe 22.

The light pipe 22 may include an elongate body portion having an outer surface. The light pipe 22 is generally formed from a material that may be a rigid material that is comprised of a curable substrate such as polymerizable compound, a mold in clear (MIC) material or mixtures thereof. Acrylates are also commonly used for forming rigid light pipes, as well as poly (methyl methacrylate) (PMMA) which is a known substitute for glass. A polycarbonate material may also be used in an injection molding process to form a rigid light pipe.

Further the light pipe 22 may be a flexible light pipe that is composed of a flexible light pipe. Flexible material may include urethanes, silicone, thermoplastic polyurethane (TPU) or other like optical grade flexible materials. Whether the light pipe 22 is a flexible light pipe or a rigid light pipe, the light pipe 22, when formed, is substantially optically transparent and capable of transmitting visible light. The light pipe 22 may be referred to as a light guide, a light plate, a light bar or any other light carrying substrate made from a transparent or substantially translucent plastic that is adapted to reflect and propagate light along a length thereof.

Figure 3:
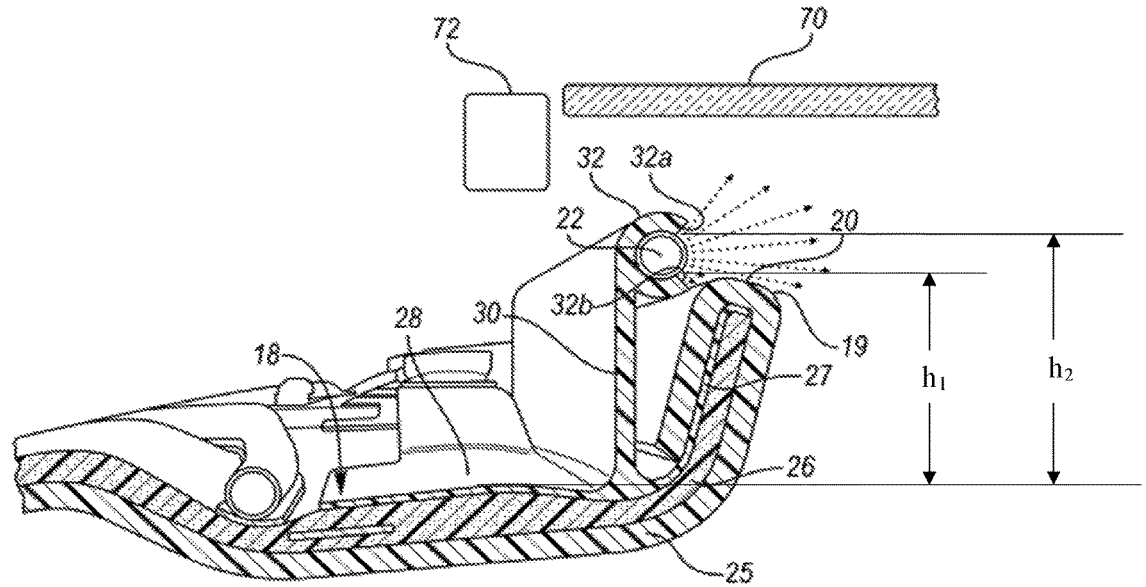
FIG. 3 is a cross sectional view taken along the lines 2-2 in FIG. 1.

Referring to FIG. 3, a cross sectional view taken along the lines 2-2 in FIG. 1, is illustrated. An inner periphery 19 of the trim component 18 may be defined by the edge wrap 20. The edge wrap 20 may extend continuously or in part around the inner periphery of the opening 12. The edge wrap 20 may be comprised of a backing layer 25 that is disposed on or along a foam or porous layer 26. A tapered sidewall 27 extends towards the opening 12 from the trim reinforcement bracket or member 28. The backing layer 25 may sandwich the foam layer 26 against one side of the tapered sidewall 27 and then fold over onto the opposite side of the tapered sidewall 27.

The backing layer 25 may act as a Class-A surface providing a finished edge look to the occupant in the vehicle. The trim component may be positioned flush against a metal roof panel (not shown) so that the light pipe 22 and edge wrap portion 20 are positioned below the sunroof window 70 and associated track 72.

A carrier or stanchion may extend from and be formed integrally with the trim reinforcement bracket 28. Because the trim reinforcement bracket and the tapered sidewalls 27 are formed integrally with one another, so too is the carrier or stanchions 30. The semi-circular portion 32 of the carrier 30 may have an internal diameter that is slightly larger than the outer diameter of the light pipe 22, so that the light pipe is held in place by a force fit condition. The semi-circular portion 32 of the carrier 30 is positioned on a distal end of the carrier that projects away from the trim reinforcement. The semi-circular portion 32 may include two opposing lips 32a and 32b that are oriented towards the edge wrap 20.

Figure 4:
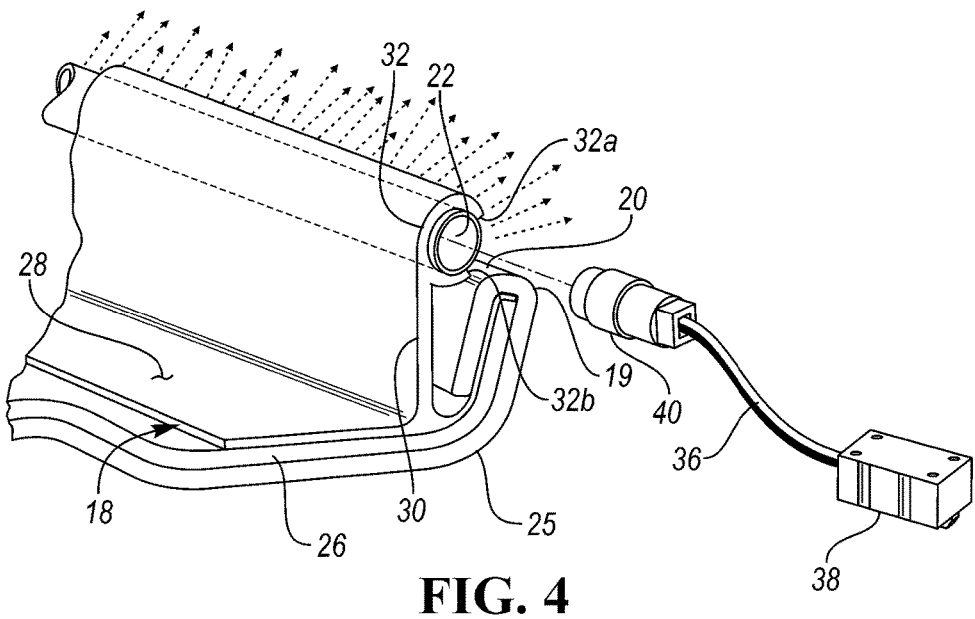
FIG. 4 is a perspective view of the trim ring component including an integrated carrier and a light pipe according to one embodiment of this disclosure.

Referring to FIG. 4, a partial-perspective view of the trim component 18 and integrated light pipe 22, is illustrated. One end, either a beginning end or a terminating end 22a of the light pipe has an opening. The opening 22a may receive a light source 40 that may include one or more LEDs. The LEDs may receive current or electricity from a power source (not shown) through the connector 38 and wire of the wire harness 36. The light source 40 or connector 38 may include a printed circuit board (PCB) that is configured to control which LED is powered, the color of the light, the brightness, and any pattern associated with those settings. For instance, the PCB may receive a signal from the controller to power the LEDs when the vehicle door is opened or closed. In a more complex example the PCB may provide power to the LED in conjunction with a beat or rhythm of music playing within the vehicle cabin.

Figure 5:
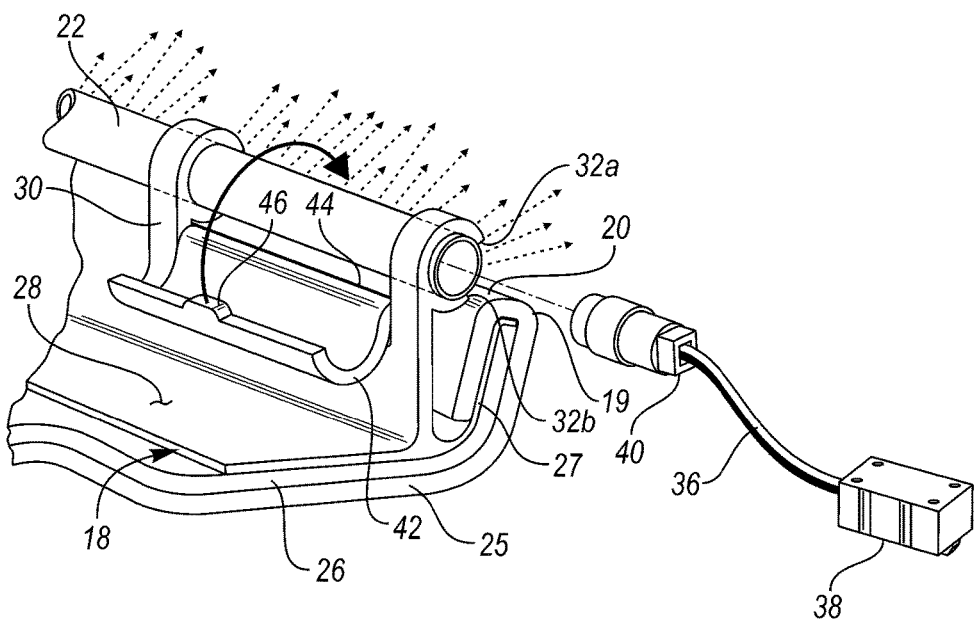
FIG. 5 is a perspective view of the trim ring component including an integrated carrier and a light pipe according to another embodiment of this disclosure.

Referring to FIG. 5, a partial-perspective view of the trim component 18 and integrated light pipe 22 according to another embodiment, is illustrated. As with the embodiments described above, the carrier or stanchions extend from and are formed integrally with the trim reinforcement member 28. The distal ends 33a and 33b of the carrier or stanchions 30 at least partially surround the light pipe 22. A cover 42 is pivotally connected to the carrier or stanchion 30 by a living hinge 44. The cover 42 may include a protrusion or tab 46 that extends from the cover 42. The tab or protrusion may engage or be received by an indent or a notch (not shown) within the stanchion or carrier 30. To assemble the light pipe 22 to the carrier or stanchion, the light pipe may be inserted into the distal ends and then secured by closing the cover 42.

The light pipe and the carrier member may be connected or attached to one another in various ways, including bonding the light pipe 22 to the carrier 30 by adhesion, like double sided tape, or by mechanical connection like brackets or tabs within the carrier 30 that snap or latch to grasp the light pipe 22. The semi-circular portion 32 of the carrier 30 may have an internal diameter that is slightly larger than the outer diameter of the light pipe 22, so that the light pipe is held in place by a force fit condition. The semi-circular portion 32 of the carrier 30 is positioned on a distal end of the carrier that projects away from the trim reinforcement. The semi-circular portion 32 may include two opposing lips 32a and 32b that are oriented towards the edge wrap 20.

In other embodiments, the light pipe 22 is integrally formed into the carrier member 30 and in turn, the trim component 18. The use of co-molding and a force fit reduce gaps between light pipe and the semi-circular carrier member. The reduction of these gaps minimizes light leakage between the light pipe 22 and the carrier.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A trim component comprising:
   a trim reinforcement having tapered sidewalls extending from an inner portion of the reinforcement, terminating at an edge to define a moonroof opening, and including carriers integrally formed with and projecting away from the trim reinforcement;
   a backing layer wrapping around the edge to define a trim ring, wherein the carriers extend around the trim ring; and
   at least one light pipe disposed within the integrated carriers.

2. The trim component of claim 1, wherein the moonroof opening defines a first plane extending between inner peripheral walls of the opening and wherein the carriers partially circumferentially surround a portion of the integrated light pipe such that when powered, the light pipe projects light in a direction orthogonal to the first plane.

3. The trim component of claim 1, wherein the trim reinforcement includes a planar portion and the carriers include distal ends that define first and second edges wherein the first edge is spaced apart from the planar portion by a first height and wherein the second edge is spaced apart from the planar portion by a second height less than the first.

4. The trim component of claim 1, wherein the carriers include a stanchion, disposed between the planar portion and the distal end, and a semi-circular clasp member pivotally attached to the stanchion and configured to move from an unlocked to a locked position to hold the light pipe.

5. The trim component of claim 1, wherein the light pipe is installed within the carriers by over molding the light pipe so that the light pipe is partially surrounded by the distal ends of the integrated carrier.

6. The trim component of claim 1, wherein distal ends of the carriers define a track having opposing lips arranged towards the sidewalls and wherein the light pipe is disposed within the track and retained by the lips.

7. The trim component of claim 1, wherein the moonroof opening includes four inner edges connected by four corners and wherein each of the light pipes extends around one of the corners and one of the inner edges.

8. A vehicle roof comprising:
   a roof panel having a sunroof opening;
   a trim reinforcement, disposed around the opening, having tapered sidewalls extending from the panel towards the opening to an edge;
   a backing folded over the edge to define a trim ring, wherein the trim panel includes carriers integrally formed with and projecting away from the reinforcement and around the trim ring; and
   at least one light pipe disposed within the carriers.

9. The vehicle roof of claim 8, wherein the sunroof opening defines a first plane extending between inner edges of the opening and wherein the carriers partially circumferentially surround a portion of the integrated light pipe such that when powered, the light pipe projects light in a direction orthogonal to the first plane.

10. The vehicle roof of claim 8, wherein the trim reinforcement includes a planar portion and the carriers include distal ends that define first and second edges wherein the first edge is spaced apart from the planar portion of the panel by a first height and wherein the second edge is spaced apart from the inner portion of the panel by a second height less than the first.

11. The vehicle roof of claim 8, wherein a distal end of the integrated stanchion defines a track having opposing lips arranged towards the sidewalls and wherein the light pipe is disposed within the track and retained by the lips.

12. The vehicle roof of claim 8, wherein the sunroof opening includes four inner edges connected by four corners wherein each of the light pipes extend around a one of the corners and one of the inner edges.

13. A trim component comprising:
   a trim reinforcement having an outer periphery extending around a sunroof opening and tapered sidewalls extending from the reinforcement and terminating at an edge;
   a backing layer wrapping around the edge to define a Class-A trim ring, wherein the trim reinforcement includes carriers integrally formed with and projecting away from the reinforcement and around the trim ring; and
   at least one light pipe disposed within the integrated carriers.

14. The trim component of claim 13, wherein the sunroof opening defines a plane and wherein when powered, the light pipe projects light in a direction that is orthogonal to the plane defined by the sunroof opening.

15. The trim component of claim 13, wherein the trim reinforcement includes a planar portion and wherein the carriers include distal ends that define first and second edges wherein the first edge is spaced apart from the inner portion of the panel by a first height and wherein the second edge is spaced apart from the inner portion of the panel by a second height less than the first.

16. The trim component of claim 15, wherein the light pipe is installed within the carriers by over molding the light pipe so that the light pipe is partially surrounded by the distal ends of the integrated carrier.

17. The trim component of claim 13, further comprising a layer of foam disposed between the trim reinforcement and the backing layer, wherein the backing layer sandwiches the foam and the trim reinforcement.

18. The trim component of claim 13, further comprising an electronic module electrically connected to a connector and wherein the at least one light pipe includes an open end and a closed end, wherein the open end receives the electronic module.

19. The trim component of claim 13, wherein the carriers include a stanchion, disposed between the planar portion and the distal end, and a semi-circular clasp member pivotally attached to the stanchion and configured to move from an unlocked to a locked position to hold the light pipe.

20. The trim component of claim 19, wherein the semi-circular clasp member includes a tab and wherein the tab is configured to engage a portion of the stanchion when the clasp is in the locked position.

\* \* \* \* \*